(12) United States Patent
Chang

(10) Patent No.: US 7,677,769 B2
(45) Date of Patent: Mar. 16, 2010

(54) DISPLAYING ASSEMBLY FOR PORTABLE ELECTRONIC DEVICE

(75) Inventor: Chia-Hsin Chang, Tu-Cheng (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 11/967,054

(22) Filed: Dec. 29, 2007

(65) Prior Publication Data

US 2009/0129096 A1    May 21, 2009

(30) Foreign Application Priority Data

Nov. 20, 2007    (CN) .................. 2007 1 0202597

(51) Int. Cl.
*F21V 5/00*    (2006.01)
(52) U.S. Cl. .................. 362/330; 362/311.02; 362/800; 362/311.06; 362/337; 362/339; 362/631

(58) Field of Classification Search ................. 362/330, 362/800, 311.02, 311.06, 337, 339, 342, 362/631
See application file for complete search history.

(56) References Cited

U.S. PATENT DOCUMENTS

| 7,047,679 | B2* | 5/2006 | Underwood et al. ........... 40/570 |
| 7,458,704 | B2* | 12/2008 | Naoi ........................... 362/330 |
| 2008/0030975 | A1* | 2/2008 | Miyashita et al. ............. 362/26 |

FOREIGN PATENT DOCUMENTS

| CN | 1670585 A | 9/2005 |
| CN | 1949060 A | 4/2007 |

\* cited by examiner

*Primary Examiner*—Sandra L O'Shea
*Assistant Examiner*—Jessica L McMillan
(74) *Attorney, Agent, or Firm*—Steven M. Reiss

(57) ABSTRACT

A displaying assembly (100) for use in a portable electronic device, includes a flexible circuit board (40), a light emitting diode (20) mounted on the flexible circuit board, and a light equalizer (10) having an optical attenuator (13) formed thereon. The light emitting diode is electrically connected to the flexible circuit board. The optical attenuator faces the light emitting diode.

9 Claims, 3 Drawing Sheets

DISPLAYING ASSEMBLY FOR PORTABLE ELECTRONIC DEVICE

BACKGROUND OF THE INVENTION

1. Field of the Invention

The present invention generally relates to displaying assemblies, particularly to a displaying assembly of a portable electronic device, such as a mobile phone.

2. Description of Related Art

With the development of wireless communication and information processing technologies, portable electronic devices, such as mobile phones and electronic notebooks, are now in widespread use. These portable electronic devices enable consumers to enjoy high technology services, almost anytime and anywhere. The displaying assembly is usually used to display operational statuses of these portable electronic devices.

A typical displaying assembly for a given portable electronic device includes a light emitting diode (LED) and a light guide plate. The light emitted from the LED is guided by the light guide plate to illuminate an icon formed on a surface of the portable electronic device, in order to display operational statuses such as missed call or short message. However, such a displaying assembly is relatively expensive.

Therefore, a new displaying assembly is desired in order to overcome the above-described problems.

SUMMARY

In one aspect thereof, a displaying assembly for a portable electronic device, includes a flexible circuit board, a light emitting diode mounted on the flexible circuit board, and a light equalizer having an optical attenuator formed thereon. The light emitting diode is electrically connected to the flexible circuit board. The optical attenuator faces the light emitting diode.

Other advantages and novel features of the embodiments will become more apparent from the following detailed description thereof, when taken in conjunction with the accompanying drawings.

BRIEF DESCRIPTION OF THE DRAWINGS

Many aspects of the present displaying assembly can be better understood with reference to the following drawings. The components in the drawings are not necessarily drawn to scale, the emphasis instead being placed upon clearly illustrating the principles of the present displaying assembly and its potential applications. Moreover, in the drawings, like reference numerals designate corresponding parts throughout the several views, in which.

DETAILED DESCRIPTION OF THE EMBODIMENTS

The present displaying assembly is suitable for portable electronic devices, such as mobile phones, PDAs, and the like. Other applications with similar displaying assembly employed can also be found.

Figure 1:
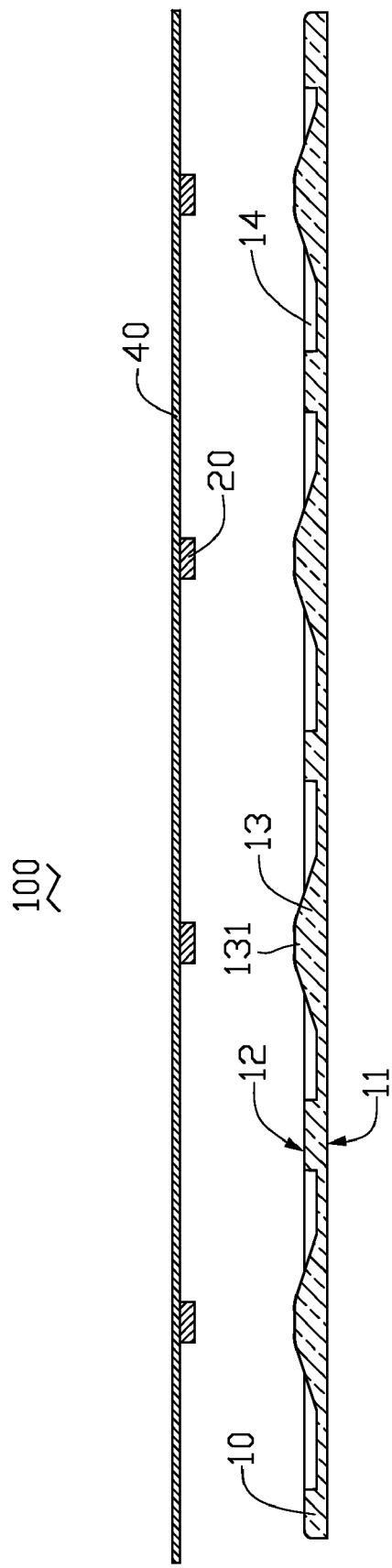
FIG. 1 is a schematic, cross-sectional view of a displaying assembly, in accordance with a present embodiment.

Referring to the drawings in detail, FIG. 1 shows a displaying assembly 100 according to a present embodiment. The displaying assembly 100 includes a flexible circuit board 40, a plurality of light emitting diodes 20 mounted on the flexible circuit board, and a light equalizer 10 having a plurality of optical attenuators 13 formed thereon. Each light emitting diode 20 is electrically connected to the flexible circuit board 40.

Figure 2:
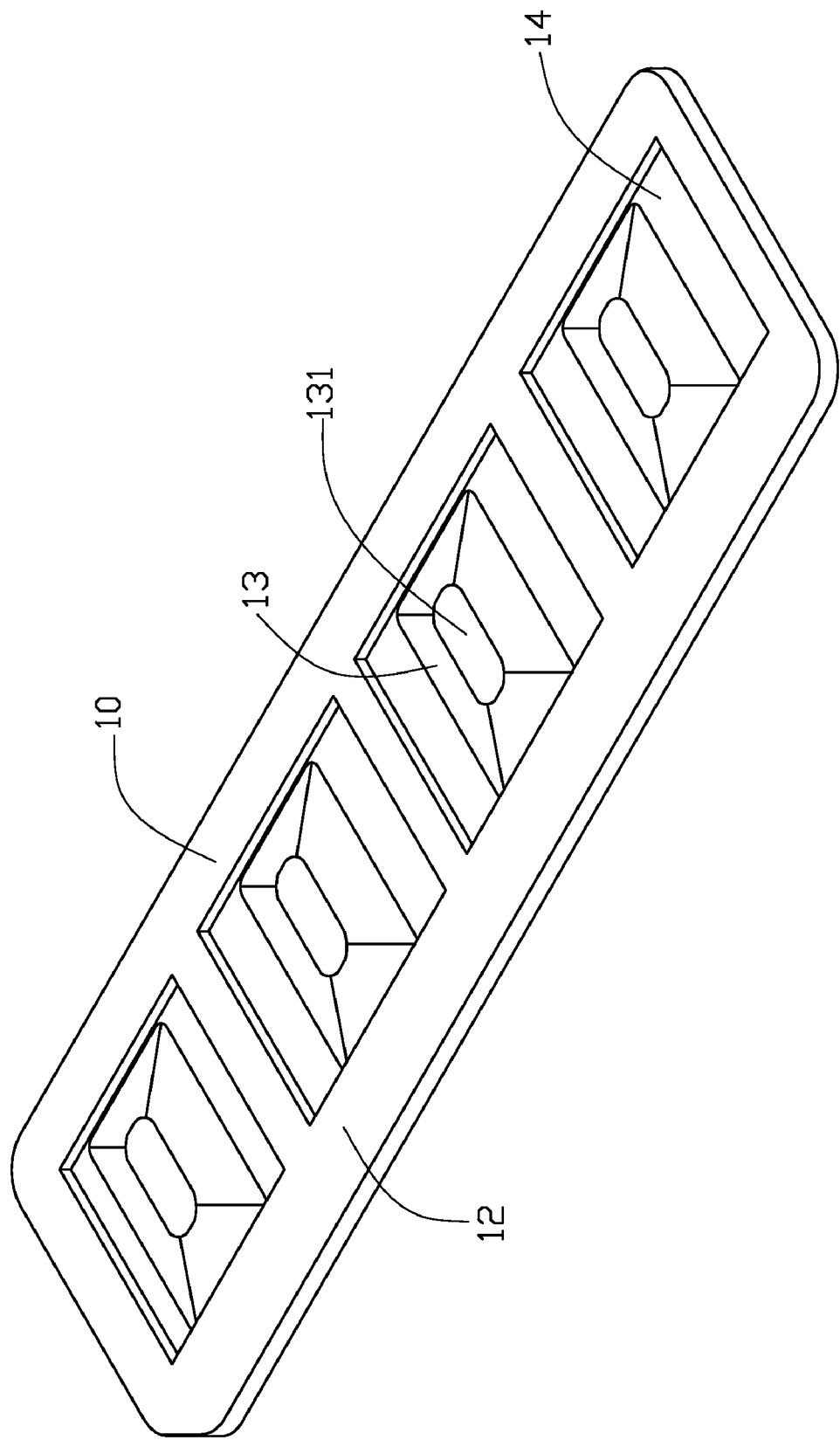
FIG. 2 is an isometric view of a light equalizer of the displaying assembly shown in FIG. 1.
Figure 3:
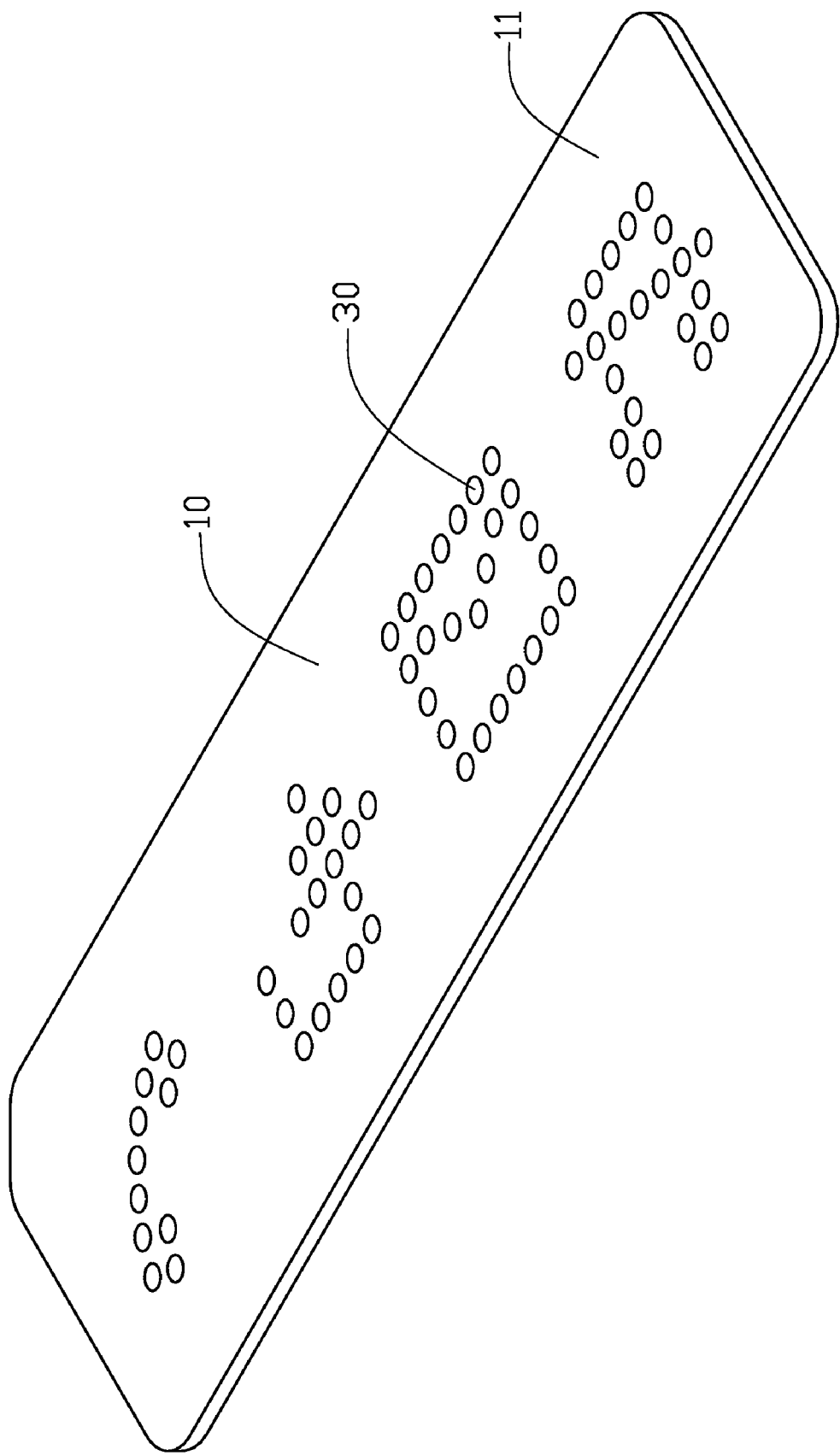
FIG. 3 is similar to FIG. 2, but shown in another aspect.

Also referring to FIGS. 2-3, the light equalizer 10 is a substantially rectangular plate and is made of a transparent material, such as polycarbonate (PC). The light equalizer 10 has an outer surface 11 formed with a plurality of icons 30 thereon and an inner surface 12 located at an opposite side of the outer surface 11. The inner surface 12 has a plurality of recesses 14 defined therein. Each recess 14 corresponds to an icon 30 and is configured for receiving a corresponding optical attenuator 13 therein. Each optical attenuator 13 is a frustum of a square pyramid in shape and has a top end 131. The thickness of each optical attenuator 13 increases gradually from an outer bottom end to the top end 131. The top end 131 of each optical attenuator 13 faces to a corresponding light emitting diode 20 in order to allow the light emitted from the light emitting diode 20 to travel through the optical attenuator 13, producing the light having same value of optical intensity.

The flexible circuit board 40 is formed with a printing ink layer and the light emitting diode 20 are formed on the printing ink layer. The printing ink layer can be white, gray, or argent for reflecting the light emitted from the light emitting diode 20 towards the light equalizer 10.

In operation, the flexible circuit board 40 drives the light emitting diode 20 to emit light. The light emitted from the light emitting diode 20 travels through a corresponding optical attenuator 13. The icon 30 corresponding to the light emitting diode 20 is illuminated by the light with same value of optical intensity to display a predetermined operational status of the portable electronic device.

It should be understood that the recesses 14 may be omitted and the optical attenuators 13 can be directly formed on the inner surface 12 of the light equalizer 10.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A displaying assembly for portable electronic device, comprising:
   a flexible circuit board;
   a light emitting diode mounted on the flexible circuit board and electrically connected to the flexible circuit board; and
   a light equalizer having an optical attenuator formed thereon, a thickness of the optical attenuator increasing gradually from one end to the other end, the optical attenuator facing the light emitting diode to allow the light emitted from the light emitting diode to travel therethrough, producing even light.

2. The displaying assembly as claimed in claim 1, wherein the optical attenuator is a frustum of a square pyramid in shape.

3. The displaying assembly as claimed in claim 2, wherein the light equalizer defines a recess configured for receiving the optical attenuator therein.

4. The displaying assembly as claimed in claim 3, wherein the light equalizer has an inner surface defining the recess and an outer surface formed with an icon corresponding to the recess.

5. The displaying assembly as claimed in claim 1, wherein the light equalizer is made of a transparent material.

6. The displaying assembly as claimed in claim 5, wherein the light equalizer is made of polycarbonate.

7. The displaying assembly as claimed in claim 1, wherein the flexible circuit board is formed with a printing ink layer.

8. The displaying assembly as claimed in claim 7, wherein the printing ink layer is white, gray, or argent to reflect the light emitted from the light emitting diode towards the light equalizer.

9. The displaying assembly as claimed in claim 1, wherein the light equalizer is a substantially rectangular plate and positioned substantially parallel to the flexible circuit board.

* * * * *